Sept. 26, 1950  F. S. BLOOM  2,523,644
CONTROLLING FUEL SUPPLY TO MULTIZONE HEATING FURNACES
Filed Sept. 4, 1946
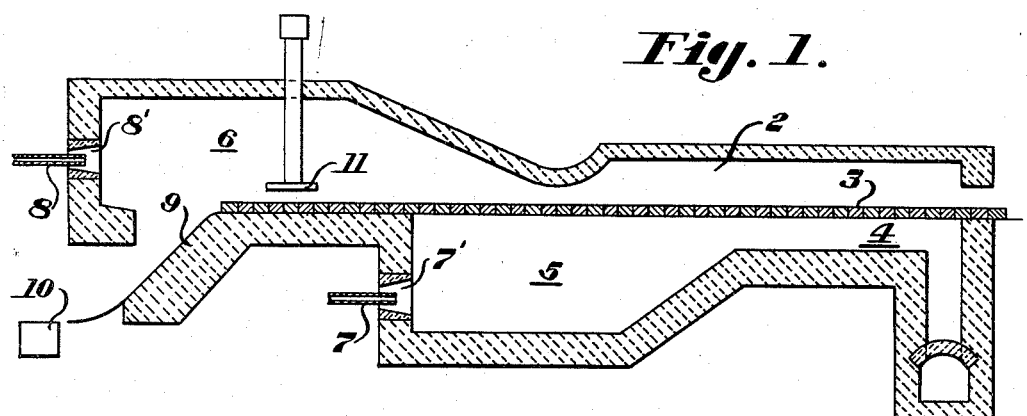
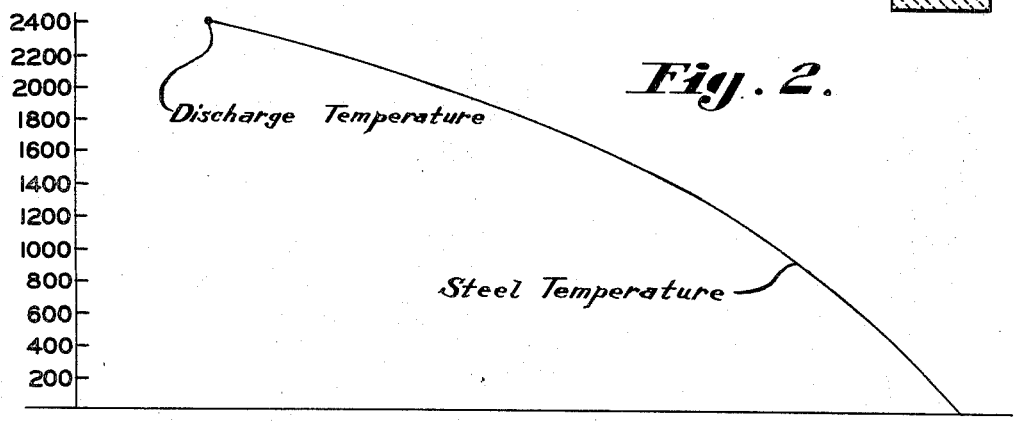
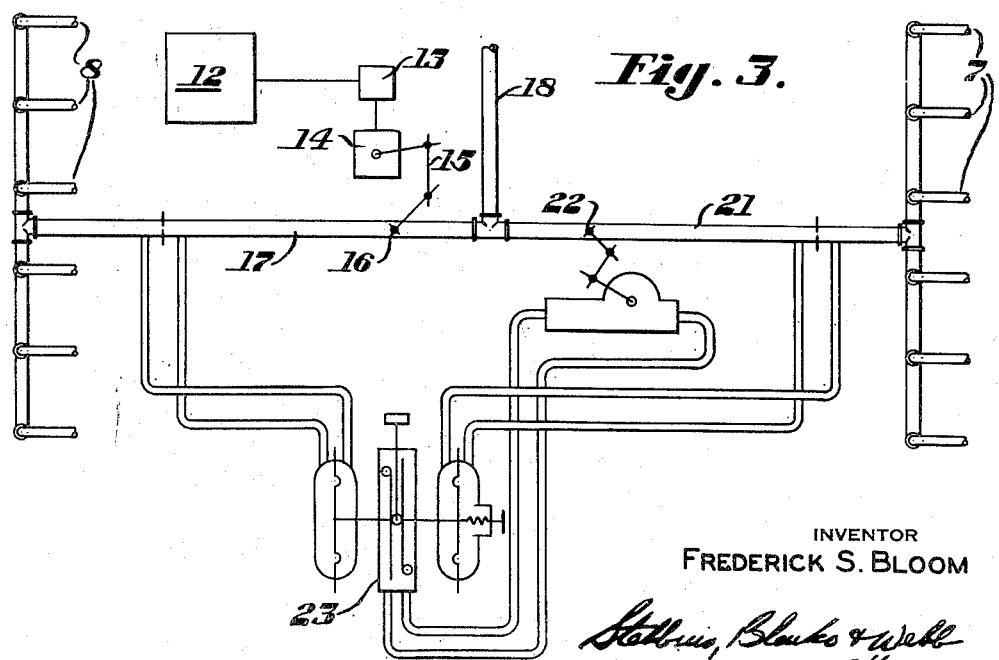
INVENTOR
FREDERICK S. BLOOM

UNITED STATES PATENT OFFICE 2,523,644

CONTROLLING FUEL SUPPLY TO MULTI-ZONE HEATING FURNACES

Frederick S. Bloom, Pittsburgh, Pa.

Application September 4, 1946, Serial No. 694,734

8 Claims. (Cl. 263—43)

This invention relates to controlling the fuel supply to multi-zone heating furnaces. It has to do with the control of the fuel supply to furnaces for heating material, as, for example, billets, slabs, shapes, etc., and which furnaces have a plurality of heating zones.

The invention will for purposes of explanation and illustration be described as embodied and practiced in apparatus for and a method of supplying fuel to a heating furnace for heating steel billets. The invention is not limited to employment in connection with the heating of steel or of billets but is perhaps most commonly embodied and practiced in apparatus for and a method of controlling the fuel supply to multi-zone heating furnaces for heating steel billets. The furnace which has been selected for illustrative purposes is an elongated furnace of the pusher type through which steel billets are moved substantially horizontally and in a straight line from the entrance end to the discharge end of the furnace, the furnace having a heating zone below the path of the billets and relatively near the entrance end of the furnace and another heating zone above the path of the billets and relatively near the discharge end of the furnace.

In the operation of multi-zone heating furnaces it is customary to introduce heat continuously in the various zones. Various methods of control have been attempted but multi-zone heating furnaces as heretofore operated have not had the efficiency desired. I have discovered how to greatly increase the efficiency of multi-zone heating furnaces and at the same time improve the quality of the material heated, i. e., in the illustrative example, steel billets.

I have found that in operation of a heating furnace having a heating zone below the path of the material and relatively close to the entrance end of the furnace and another heating zone above the path of the material and relatively close to the discharge end of the furnace a great deal of heat is wasted in the first mentioned zone. I find that remarkable efficiency and saving of fuel can be obtained and a product of improved quality produced if when the furnace is operated at low capacity the heat is introduced entirely or substantially entirely in the second zone and when the furnace is operated at progressively increasing capacities heat is added in the first zone and for higher capacities the heat input in the first zone is increased at a faster rate than the rate of increase of heat input in the second zone. I prefer to supply heat entirely in the second zone until the rate of fuel supply is about 40% of the maximum rated capacity of the burner means at the second zone. Thereafter as more and more heat is required to attain the desired discharge temperature I add fuel in the first zone while continuing to increase the amount of fuel added in the second zone. Desirably, however, as the quantity of fuel required increases I increase the rate of supply of fuel to the first zone faster than I increase the rate of supply of fuel to the second zone, preferably about doubling it.

I provide, in the supplying of fuel to a multi-zone heating furnace, the steps of supplying fuel at one zone at a rate sufficient to maintain a predetermined temperature at a selected point up to a predetermined rate and when the rate of supply of fuel at said zone attains said predetermined rate and more fuel is required to maintain said temperature at said point increasing the rate of supply of fuel at said zone and simultaneously supplying additional fuel at another zone at a rate bearing a predetermined relationship to the rate of supply of fuel at the first mentioned zone and such that the fuel supplied at the first mentioned zone and that supplied at the second mentioned zone together maintain said temperature at said point. Preferably the temperature used for control is the discharge temperature, either the furnace temperature at point of material discharge or the temperature of the work as it is discharged from the furnace. Preferably I supply fuel at one zone sufficient to maintain a predetermined material discharge temperature up to a rate about 40% of the maximum rated capacity of the burner means at said zone and when the rate of supply of fuel at said zone attains about 40% of the maximum rated capacity of the burner means at said zone and more fuel is required to maintain the predetermined discharge temperature I increase the rate of supply of fuel at said zone and simultaneously supply additional fuel at another zone at a rate bearing a predetermined relationship to the rate of supply of fuel at the first mentioned zone and such that the fuel supplied at the first mentioned and that supplied at the second mentioned zone together maintain the discharge temperature. While the predetermined relationship between the two rates of supplying fuel may vary depending on conditions, I preferably increase the rate of supplying fuel at the second-mentioned zone faster than I increase the rate of supplying fuel at the first mentioned zone. Desirably, I increase the rate of supplying fuel at the second-mentioned zone twice as fast as I increase the rate of supplying fuel at the first mentioned zone. The aggregate fuel supply should be such as to maintain the desired discharge temperature.

I further provide fuel supply apparatus for supplying fuel to a multi-zone heating furnace comprising a source of fuel, burner means respectively at a plurality of zones in the furnace, connections from the source of fuel to the burner means at the respective zones, a controller responsive to the temperature at a selected point in the furnace and controlling the flow of fuel to the furner means at one zone at a rate sufficient to maintain a predetermined temperature at said point up to a predetermined rate, a ratio regulator responsive to the flow of fuel to the burner means at said zone regulating flow of fuel to the burner means at another zone so that when the rate of flow of fuel to the burner means at the first mentioned zone attains said predetermined rate and more fuel is required to maintain said temperature at said point further increase of the rate of flow of fuel to the burner means at the first mentioned zone causes flow of fuel to the burner means at the second mentioned zone at a rate bearing a predetermined relationship to the rate of flow of fuel to the burner means at the first mentioned zone and such that the fuel supplied at the first mentioned zone and that supplied at the second mentioned zone together maintain said temperature at said point. The controller may control a valve in the fuel line leading to the burner means at one zone and the ratio regulator may be responsive either to the fuel flow moving to the first mentioned zone or to the position of the valve controlling the flow of fuel to the first mentioned zone and regulates the fuel flowing to the burner means at the second mentioned zone.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same, in which Figure 1 is a diagrammatic vertical central longitudinal cross-sectional view through a furnace for heating steel billets;

Figure 2 is a curve in which steel temperature is plotted against position in furnace showing the manner in which steel billets may be heated according to my invention in the furnace of Figure 1; and Figure 3 is a diagram of apparatus which may be employed for control of the flow of fuel to the burner means at the respective zones of the furnace.

Referring now more particularly to Figure 1, the furnace may be conventional, comprising means forming an elongated enclosure 2 through which shapes 3 are adapted to be moved generally horizontally in a straight line. Ordinarily the shapes are pushed through the furnace in the direction from right to left viewing Figure 1.

The means for supporting and pushing the work through the furnace may be conventional and hence are not shown. The work passes first through a preheating zone 4, then through a heating zone 5 and finally through a heating zone 6. The work is preheated in the zone 4, is further heated in the zone 5 where heat may be applied to the work from beneath and is finally heated to discharge temperature in the zone 6 where heat is applied from above. The burners are shown at 7 and 8, respectively, and are introduced through burner openings 7' and 8' for heating the zones 5 and 6 respectively. As each billet reaches the incline 9 it slides down that incline to a roller table 10 on which it is delivered to the rolling mill or other processing apparatus.

A temperature controller has a heat sensitive portion 11 disposed in the zone 6 so as to be responsive to the temperature in that zone. The controller may be responsive to the temperature of the atmosphere in zone 6 or to the temperature of the heated work, depending upon its precise positioning. The controller may be conventional, being designated 12 in Figure 3 and operating through a relay 13 a motor 14 and linkage 15 to turn a butterfly valve 16 in a fuel conduit 17 leading from a main fuel supply conduit 18. The fuel conduit 17 leads to the burners 8 in zone 6.

The temperature controller 12 is set for a predetermined temperature. If the temperature in zone 6 falls below the temperature for which the controller 12 is set the controller operates in normal manner to open valve 16 and admit more fuel to the burners 8 whereby the temperature in zone 6 is increased. If the temperature rises slightly above the temperature for which the controller 12 is set the controller operates in its usual way to turn the valve 16 toward closed position, reducing the rate of flow of fuel to the burners 8 and hence lowering the temperature in zone 6.

When the furnace is operated at low capacity I apply heat only by operation of the burners 8. The burners 7 operating through the burner openings 7' are not employed when the furnace is operating at low capacity. I find that when the burners 8 are operated at a rate not greatly exceeding about 40% of the maximum rated capacity thereof most efficient results are obtained by using only the burners 8 and not introducing heat elsewhere in the furnace. When, however, the rate of delivery of fuel to the burners 8 substantially exceeds about 40% of the maximum rated capacity of such burners it is desirable to add heat in zone 5. Fuel is delivered to the burners 7 through a conduit 21 communicating with the main fuel supply conduit 18. A valve 22 controls the flow of fuel through the conduit 21. The valve 22 is operated by a ratio regulator indicated diagrammatically in Figure 3 and designated generally by reference numeral 23. Any conventional ratio regulator may be employed, as, for example, an Askania ratio regulator equipped with a conventional bias spring. The regulator is responsive to the rate of fuel flow through the conduit 17 and operates the valve 22 to control the rate of fuel flow through the conduit 21 so that the rates of fuel flow through the conduits 17 and 21 have a predetermined relationship to each other. Desirably the regulator maintains the valve 22 closed until the rate of fuel flow through the conduit 17 is such that the fuel delivery therethrough exceeds about 40% of the maximum rated capacity of the burners 8. When the fuel flow through the conduit 17 exceeds about 40% of the maximum rated capacity of the burners 8 and more fuel is required to maintain the predetermined discharge temperature for which the controller 12 is set I increase the rate of supply of fuel through the conduit 17 and also simultaneously through the regulator 23 causing opening of the valve 22 to supply additional fuel through the conduit 21 and the burners 7 to add heat in the zone 5. I find it desirable to increase the rate of feed of fuel to the burners 7 faster than I increase the rate of feed of fuel to the burners 8 after the valve 22 begins to open; that is to say, after the rate of feed of fuel through the conduit 17 substantially exceeds about 40% of the maximum rated capacity of the burners 8. While the relationship between the rate of feed of fuel through the conduit 17 and the rate of feed of fuel through the conduit 21 may vary substantially depending on conditions I find that generally speaking excellent results are obtained when the rate of supply of fuel at the zone 5 is increased twice as fast as the rate of supply of fuel at the zone 6. When both the burners 8 and the burners 7 are being employed simultaneously they cooperatively maintain the desired discharge temperature.

The curve of Figure 2 shows how steel temperature increases with travel through the furnace when my control system is employed. The highest temperature is the discharge temperature which is used for control purposes. I can save 25% or more of the amount of fuel which is used in similar furnaces not equipped with my control mechanism as commonly operated by those skilled in the art. It is to be understood that by manual adjustment of the ratio regulator slider various relationships between rate of fuel flow to the burners 8 and rate of fuel flow to the burners 7 may be obtained. The equipment employed may vary widely. The regulator may operate from the fuel flow itself in the conduit 17 or it may operate from the valve 16 or the handle thereof, as the position of the valve is an index of flow volume. Valve 22 can be controlled by electric, hydraulic or pneumatic devices as may be desired in any particular instance.

While I have shown and described a present preferred embodiment of the invention and have illustrated a present preferred method of practicing the same, it is to be distinctly understood that the invention is not limited thereto but may be otherwise variously embodied and practiced within the scope of the following claims.

I claim:

1. In the supplying of fuel to a heating furnace through which material to be heated is adapted to pass and which has a first heating zone relatively near the material inlet and a second heating zone relatively near the material outlet, the steps of supplying fuel at the second zone at a rate sufficient to maintain a predetermined discharge temperature up to a predetermined rate and when the rate of supply of fuel at the second zone attains said predetermined rate and more fuel is required to maintain said discharge temperature increasing the rate of supply of fuel at the second zone and simultaneously supplying additional fuel at the first zone at a rate bearing a predetermined relationship to the rate of supply of fuel at the second zone and such that the fuel supplied at the first zone and that supplied at the second zone together maintain said discharge temperature.

2. In the supplying of fuel to a heating furnace through which material to be heated is adapted to pass generally horizontally in a straight line and which has a first heating zone below the path of the material and relatively near the material inlet and a second heating zone above the path of the material and relatively near the material outlet, the steps of supplying fuel at the second zone at a rate sufficient to maintain a predetermined discharge temperature up to a predetermined rate and when the rate of supply of fuel at the second zone attains said predetermined rate and more fuel is required to maintain said discharge temperature increasing the rate of supply of fuel at the second zone and simultaneously supplying additional fuel at the first zone at a rate bearing a predetermined relationship to the rate of supply of fuel at the second zone and such that the fuel supplied at the first zone and that supplied at the second zone together maintain said discharge temperature.

3. In the supplying of fuel to a heating furnace through which material to be heated is adapted to pass generally horizontally in a straight line and which has a first heating zone below the path of the material and relatively near the material inlet and a second heating zone above the path of the material and relatively near the material outlet, the steps of supplying fuel at the second zone at a rate sufficient to maintain a predetermined discharge temperature up to a rate about 40% of the maximum rated capacity of the burner means at the second zone and when the rate of supply of fuel at the second zone attains about 40% of the maximum rated capacity of the burner means at the second zone and more fuel is required to maintain said discharge temperature increasing the rate of supply of fuel at the second zone and simultaneously supplying additional fuel at the first zone at a rate bearing a predetermined relationship to the rate of supply of fuel at the second zone and such that the fuel supplied at the first zone and that supplied at the second zone together maintain said discharge temperature.

4. In the supplying of fuel to a heating furnace through which material to be heated is adapted to pass generally horizontally in a straight line and which has a first heating zone below the path of the material and relatively near the material inlet and a second heating zone above the path of the material and relatively near the material outlet, the steps of supplying fuel at the second zone at a rate sufficient to maintain a predetermined discharge temperature up to a rate about 40% of the maximum rated capacity of the burner means at the second zone and when the rate of supply of fuel at the second zone attains about 40% of the maximum rated capacity of the burner means at the second zone and more fuel is required to maintain said discharge temperature increasing the rate of supply of fuel at the second zone and simultaneously supplying additional fuel at the first zone at a predetermined rate, and increasing the rate of supply of fuel at the first zone faster than at the second zone, the aggregate fuel supply being such as to maintain said discharge temperature.

5. Fuel supply apparatus for supplying fuel to a heating furnace through which material to be heated is adapted to pass and which has a first heating zone relatively near the material inlet and a second heating zone relatively near the material outlet comprising a source of fuel, burner means at each of said zones, connections from the source of fuel to the burner means at the respective zones, a controller responsive to the discharge temperature and controlling the flow of fuel to the burner means at the second zone at a rate sufficient to maintain a predetermined discharge temperature up to a predetermined rate, a ratio regulator responsive to the flow of fuel to the burner means at the second zone regulating flow of fuel to the burner means at the first zone so that when the rate of flow of fuel to the burner means at the second zone attains said predetermined rate and more fuel is required to maintain said predetermined discharge temperature further increase of the rate of flow of fuel to the burner means at the second zone causes flow of fuel to the burner means at the first zone at a rate bearing a predetermined relationship to the rate of flow of fuel to the burner means at the second zone and such that the fuel supplied at the first zone and that supplied at the second zone together maintain said predetermined discharge temperature.

6. Fuel supply apparatus for supplying fuel to a heating furnace through which material to be heated is adapted to pass generally horizontally in a straight line and which has a first heating zone below the path of the material and relatively near the material inlet and a second heating zone above the path of the material and relatively near the material outlet comprising a source of fuel, burner means at each of said zones, connections from the source of fuel to the burner means at the respective zones, a controller responsive to the discharge temperature and controlling the flow of fuel to the burner means at the second zone at a rate sufficient to maintain a predetermined discharge temperature up to a predetermined rate, a ratio regulator responsive to the flow of fuel to the burner means at the second zone regulating flow of fuel to the burner means at the first zone so that when the rate of flow of fuel to the burner means at the second zone attains said predetermined rate and more fuel is required to maintain said predetermined discharge temperature further increase of the rate of flow of fuel to the burner means at the second zone causes flow of fuel to the burner means at the first zone at a rate bearing a predetermined relationship to the rate of flow of fuel to the burner means at the second zone and such that the fuel supplied at the first zone and that supplied at the second zone together maintain said predetermined discharge temperature.

7. Fuel supply apparatus for supplying fuel to a heating furnace through which material to be heated is adapted to pass generally horizontally in a straight line and which has a first heating zone below the path of the material and relatively near the material inlet and a second heating zone above the path of the material and relatively near the material outlet comprising a source of fuel, burner means in each of said zones, connections from the source of fuel to the burner means at the respective zones, a controller responsive to the discharge temperature and controlling the flow of fuel to the burner means at the second zone at a rate sufficient to maintain a predetermined discharge temperature up to a rate about 40% of the maximum rated capacity of the burner means at the second zone, a ratio regulator responsive to the flow of fuel to the burner means at the second zone regulating flow of fuel to the burner means at the first zone so that when the rate of flow of fuel to the burner means at the second zone attains about 40% of the maximum rated capacity of the burner means at the second zone and more fuel is required to maintain said predetermined discharge temperature further increase of the rate of flow of fuel to the burner means at the second zone causes flow of fuel to the burner means at the first zone at a rate bearing a predetermined relationship to the rate of flow of fuel to the burner means at the second zone and such that the fuel supplied at the first zone and that supplied at the second zone together maintain said predetermined discharge temperature.

8. Fuel supply apparatus for supplying fuel to a heating furnace through which material to be heated is adapted to pass generally horizontally in a straight line and which has a first heating zone below the path of the material and relatively near the material inlet and a second heating zone above the path of the material and relatively near the material outlet comprising a source of fuel, burner means in each of said zones, connections from the source of fuel to the burner means at the respective zones, a controller responsive to the discharge temperature and controlling the flow of fuel to the burner means at the second zone at a rate sufficient to maintain a predetermined discharge temperature up to a rate about 40% of the maximum rated capacity of the burner means at the second zone, a ratio regulator responsive to the flow of fuel to the burner means at the second zone regulating flow of fuel to the burner means at the first zone so that when the rate of flow of fuel to the burner means at the second zone attains about 40% of the maximum rated capacity of the burner means at the second zone and more fuel is required to maintain said predetermined discharge temperature further increase of the rate of flow of fuel to the burner means at the second zone causes flow of fuel to the burner means at the first zone at substantially a predetermined rate, the aggregate fuel supply being such as to maintain said predetermined discharge temperature.

FREDERICK S. BLOOM.

REFERENCES CITED

The following references are of record in the file of this patent:

UNITED STATES PATENTS

| Number | Name | Date |
|---|---|---|
| 1,912,933 | Culbertson | June 6, 1933 |
| 1,944,729 | Charlesworth | Jan. 23, 1934 |
| 2,133,673 | Spencer et al. | Oct. 18, 1938 |
| 2,246,550 | Stewart et al. | June 24, 1941 |
| 2,298,149 | Morton | Oct. 6, 1942 |
| 2,362,045 | Bliss | Nov. 7, 1944 |
| 2,390,806 | Nagel | Dec. 11, 1945 |
| 2,451,349 | Morton | Oct. 12, 1948 |